United States Patent
Yamada et al.

(10) Patent No.: US 6,886,542 B2
(45) Date of Patent: May 3, 2005

(54) FUEL FEED APPARATUS HAVING SUB-TANK

(75) Inventors: Katsuhisa Yamada, Okazaki (JP); Kiyoshi Nagata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/770,466

(22) Filed: Feb. 4, 2004

(65) Prior Publication Data

US 2004/0168678 A1 Sep. 2, 2004

(30) Foreign Application Priority Data

Feb. 27, 2003 (JP) ........................................ 2003-051184

(51) Int. Cl.⁷ .............................................. F02M 37/04
(52) U.S. Cl. ...................................................... 123/509
(58) Field of Search ................................ 123/509, 510, 123/495, 497

(56) References Cited

U.S. PATENT DOCUMENTS

| | | | |
|---|---|---|---|
| 4,869,225 A | | 9/1989 | Nagata et al. |
| 5,038,741 A | * | 8/1991 | Tuckey ........................ 123/509 |
| 5,769,061 A | | 6/1998 | Nagata et al. |
| 6,062,203 A | * | 5/2000 | Takahashi et al. ........... 123/509 |
| 6,253,738 B1 | * | 7/2001 | Takahashi et al. ........... 123/509 |

FOREIGN PATENT DOCUMENTS

JP          2001-132568          5/2001

* cited by examiner

*Primary Examiner*—Thomas Moulis
(74) *Attorney, Agent, or Firm*—Nixon & Vanderhye P.C.

(57) ABSTRACT

A fuel feed apparatus has a flange and a sub-tank detachable each other in its axial direction. A connector protrudes from the flange toward the sub-tank, and opposes to a space formed in the sub-tank. The connector is received in the space when the flange is mounted on the sub-tank. Therefore, the connector can be prevented from interference with a pump module eccentrically arranged in the sub-tank. The space is defined in the opposite side of the fuel pump, so that the inner space of the sub-tank is widely secured and efficiently used. Thus, distance between the flange and the sub-tank can be reduced, so that the height of the fuel feed apparatus can be reduced.

14 Claims, 8 Drawing Sheets

FUEL FEED APPARATUS HAVING SUB-TANK

CROSS REFERENCE TO RELATED APPLICATION

This application is based on and incorporates herein by reference Japanese Patent Application No. 2003-51184 filed on Feb. 27, 2003.

FIELD OF THE INVENTION

The present invention is related to a fuel feed apparatus for pumping fuel from a fuel tank to the outside of the fuel tank.

BACKGROUND OF THE INVENTION

A fuel feed apparatus proposed in JP-A-2001-132568 has a sub-tank for receiving fuel. The sub-tank is connected with a lid, so as to be displaceable each other in the axial direction of the lid. The sub-tank is pressed onto the inner bottom plane of the fuel tank regardless of the volume (height) of the fuel tank. Thus, the fuel feed apparatus can stably supply fuel even if a fuel amount remaining in the fuel tank decreases.

Recently, it is demanded that the height of the fuel tank be decreased for securing a passenger space in a vehicle. Therefore, the height of the fuel feed apparatus is demanded be decreased.

However, the sub-tank of the fuel feed apparatus includes various kinds of components such as a fuel pump, a fuel filter, and a pressure regulator. Each component has a large volume, so that the components occupy a large space in the sub-tank. Other devices such as a connector, and a cut-off valve are arranged on the lid so as to protrude from the lid toward the sub-tank. Here, the devices protruding from the lid are apt to interfere with the devices in the sub-tank, when the height of the fuel feed apparatus is reduced.

SUMMARY OF THE INVENTION

In view of the foregoing problems, it is an object of the present invention to propose a fuel feed apparatus, such that interference between a device provided on a lid and devices provided in a sub-tank is reduced, so that the height of the fuel feed apparatus is reduced.

In the present invention, a fuel feed apparatus is received in an opening of a fuel tank for pumping fuel in the fuel tank, and includes a lid, a sub-tank, a fuel pump, and an auxiliary device.

The lid covers the opening of the fuel tank. The sub-tank is received in the fuel tank, and is axially movably connected to the lid. The fuel pump is received in the sub-tank, and pumps fuel received in the fuel tank. The auxiliary device is provided to the lid, and projects from the lid toward a base wall of the sub-tank.

The lid is movable relative to the sub-tank in the axial direction, which is generally perpendicular to the plane of the lid. The first auxiliary device is at least partially received on the distal end side, which is oriented toward the base wall of the sub-tank and is distal from the lid, in a space defined in the sub-tank on the lid side. The first auxiliary device is opposed the space.

The fuel pump is eccentrically arranged in the sub-tank. The space is defined in the opposite side of the fuel pump with respect to a central axis of the sub-tank.

The sub-tank has a step section on a peripheral side of the sub-tank. The space is at least partially non-overlapping with respect to the step section in a circumferential direction of the sub-tank.

Therefore, the auxiliary device is at least partially received in the space of the sub-tank without interference, when the lid is connected to the sub-tank. Thus, the height of the fuel feed apparatus can be decreased.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
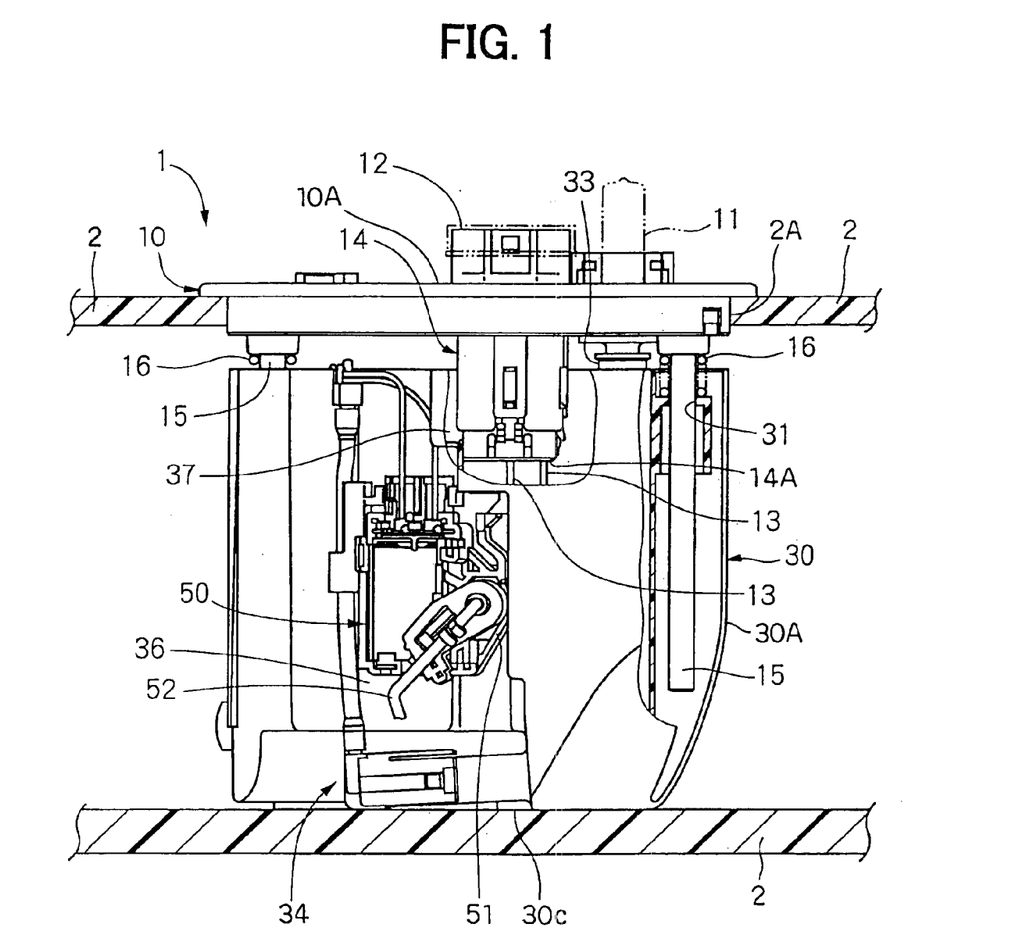
FIG. 1 is a partially cross-sectional side view showing a fuel feed apparatus according to the first embodiment of the present invention.

As shown in FIG. 1, a disc-shaped flange (lid) 10 of a fuel feed apparatus 1 is mounted on a top wall of a fuel tank 2 of a vehicle, so as to cover an opening 2A of the fuel tank 2. Components (sub-tank side components) of the fuel feed apparatus 1 are received in the fuel tank 2, except for the flange 2. The fuel tank 2 is formed in a saddleback-shape so as not to interfere with a driveshaft (not shown). The fuel tank 2 includes both tank sections, such that a tank section which receives a pump module 20 (FIG. 2) and another tank section to which fuel can be transferred by a transfer jet pump 40.

A fuel discharge pipe 11 and an electric connector 12 are provided on the flange 10. The fuel discharge pipe 11 is used for transferring fuel to the outside of the fuel tank 2. The fuel is discharged from a fuel pump 21 included in the pump module 20. The electric connector 12 is connected with an electric power supply and an ECU (electronic control unit, not shown). A connector (first auxiliary device) 14 is secured on the flange 10. The connector 14 protrudes from the flange 10 toward a bottom base wall 30C of the sub-tank 30 in an axial direction of the flange 10. The axial direction of the flange 10 is generally perpendicular to the approximately flat plane of the flange 10, that is generally perpendicular to either the top plane or the bottom plane of the flange 10 in FIG. 1. The connector 14 includes a wiring member (not shown), so as to be electrically connected with the electric connector 12.

Figure 2:
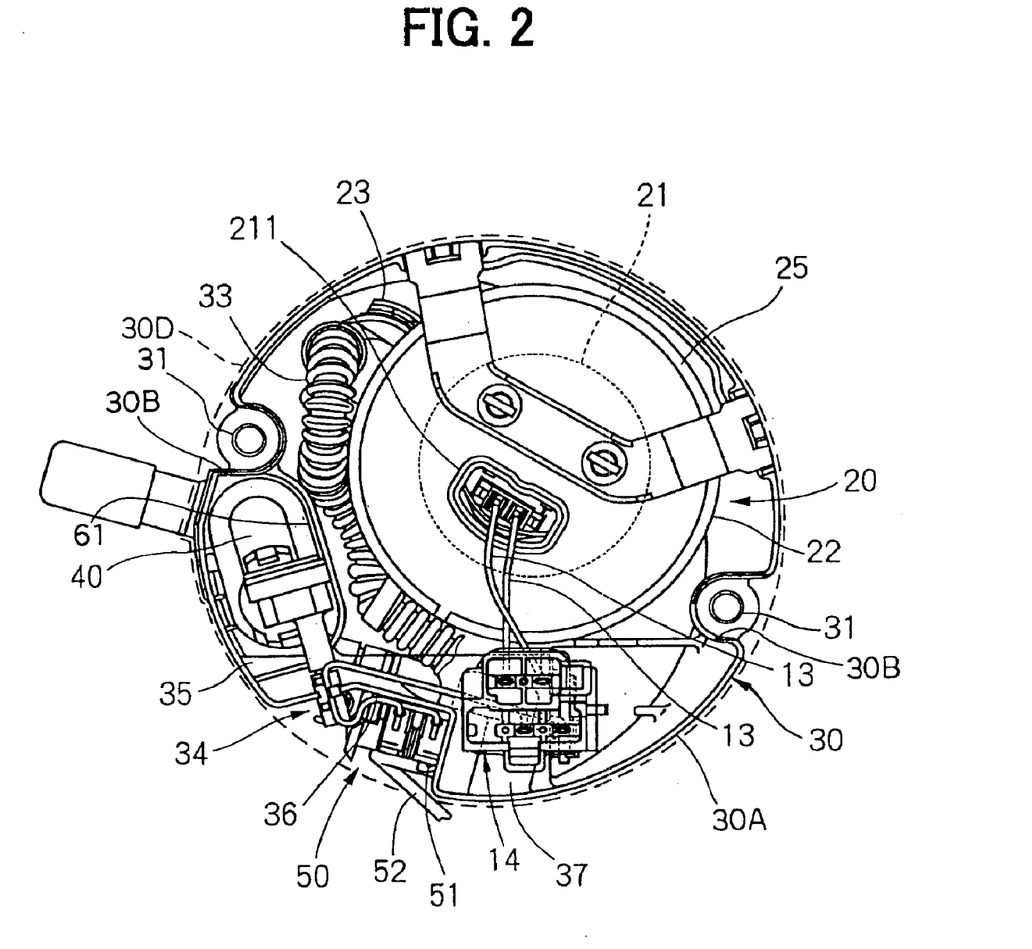
FIG. 2 is a plan view showing the fuel feed apparatus including a sub-tank and a connector protruding from a flange according to the first embodiment.

As shown in FIG. 2, the connector 14 is electrically connected with the fuel pump 21 via lead wires 13, so that electric power from an electric power source is supplied to the fuel pump 21 via the lead wires 13.

The sub-tank 30 has cross-sectionally arc-shaped recessed sections 30B. The recessed sections 30B are recessed from an outer wall 30A of the sub-tank 30, in the diametric direction of the sub-tank 30. Namely, the recessed sections 30B are included in a substantially circular project area 30D of the sub-tank 30. Here, the project area 30D of the sub-tank 30 is an area projected toward the top surface (installation surface) of the fuel tank 2.

Insertion sections 31 are formed in the recessed sections 30B of the sub-tank 30. Shafts (i.e., supporting members) 15, are loosely inserted into the insertion sections 31 at one ends, and are press-inserted into the flange 10 at the other ends. The insertion sections 31 and the shafts 15 do not protrude from the sub-tank 30 (the project area 30D) in the diametrical direction of the sub-tank 30, so that the project area 30D of the sub-tank 30 may be downsized. Springs 16 are provided around the shafts 15 so that the flange 10 and the sub-tank 30 are biased apart from each other. The flange 10 can be displaced from the sub-tank 30 in the axial direction of the flange 10. Expansion and shrinkage may arise in the fuel tank 2, as inner pressure of the fuel tank 2 varies. The inner pressure of the fuel tank 2 varies due to a temperature variation or a variation of a fuel amount contained in the fuel tank 2. Even if expansion or shrinkage arises in the fuel tank 2, the bottom section of the sub-tank 30 is held pressed onto the bottom inner surface of the fuel tank 2 by force of the springs 16.

Figure 3:
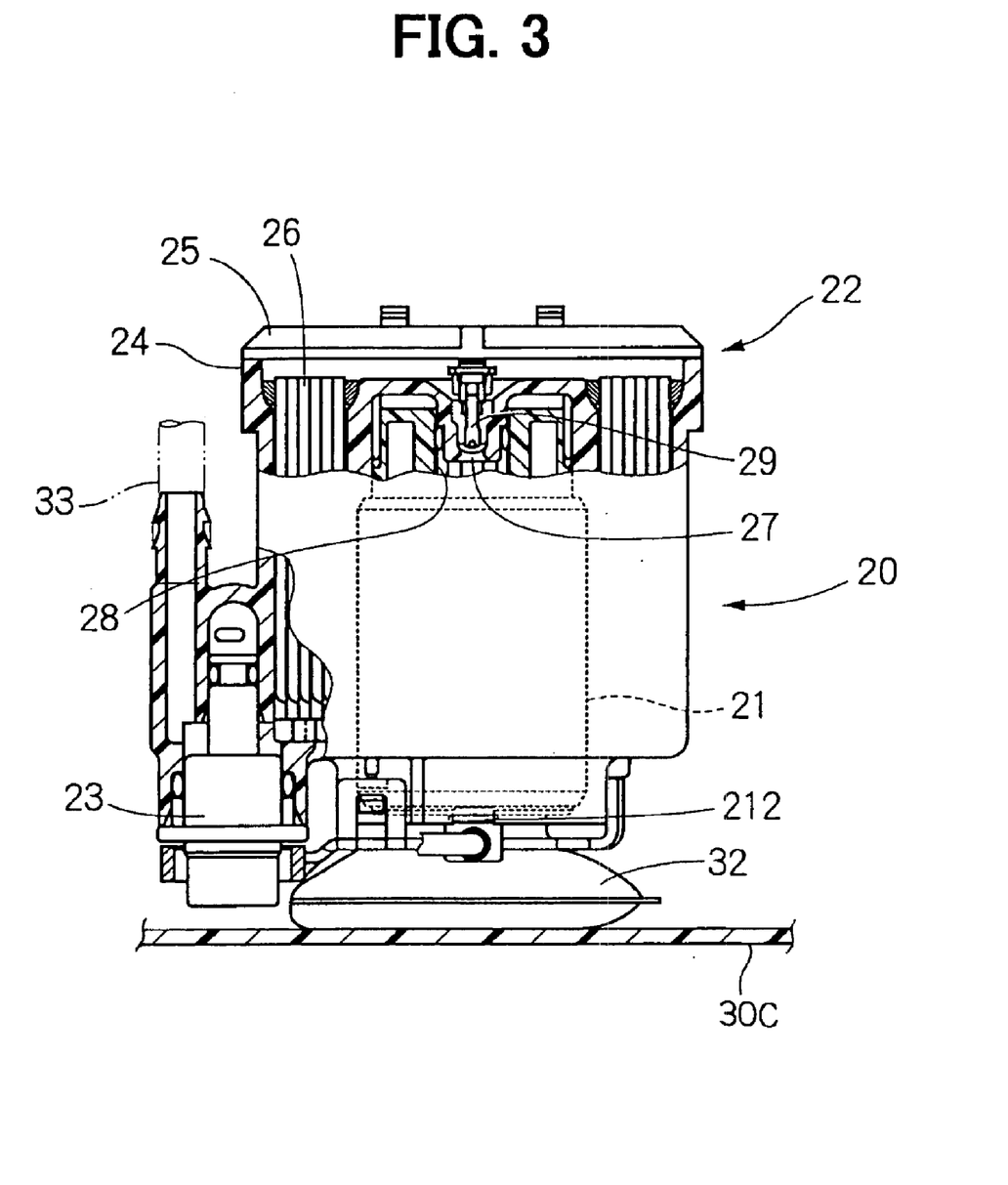
FIG. 3 is a partially cross-sectional side view showing a pump module of the fuel feed apparatus.

The pump module 20, a suction filter 32 and the like are received in the sub-tank 30. As shown in FIG. 3, the pump module 20 includes a fuel filter 22, the fuel pump 21 and a pressure regulator 23. The fuel filter 22 includes a casing 24, a lid 25, and a filter element 26. The fuel filter 22 surrounds the fuel pump 21 in the circumferential direction of the fuel pump 21. The casing 24 is fixed to the lid 25 by welding or the like, so that the casing 24 and the lid 25 form a filter case. An inlet port 27 of the casing 24 fits to a discharge port 28 of the fuel pump 21. A check valve 29 is received in the inlet port 27 for inhibiting fuel from reverse flow. The filter element 26 removes debris included in fuel discharged by the fuel pump 21.

The discharge port 28 of the fuel pump 21 is located on the upper side with respect to the gravitational direction, and a suction port 212 of the fuel pump 21 is located on the lower side with respect to the gravitational direction.

As shown in FIG. 2, the fuel pump 21 includes a connector section 211 electrically connected with the connector 14 via the lead wires 13. The connector section 211 is exposed from the lid 25 of the pump module 20. The fuel pump 21 receives a motor (not shown). The fuel pump 21 draws fuel using a rotation member such as an impeller. The impeller is rotated by the motor.

As shown in FIG. 3, the inlet port (not shown) of the pressure regulator 23 is connected with the outlet port (not shown) of the casing 24. The fuel pump 21 discharges fuel, and the filter element 26 removes debris of the fuel discharged by the fuel pump 21. Subsequently, the pressure regulator 23 controls pressure of the fuel filtered by the filter element 26. The fuel supplied from the pressure regulator 23 flows into the fuel discharge pipe 11 (FIG. 1) via a flexible tube 33.

The suction filter 32 is connected with the suction port 212 of the fuel pump 21, and contacts the inner surface of the base wall 30C of the sub-tank 30. The outer periphery of the suction filter 32 is covered with non-woven fabric for removing relatively large debris included in fuel drawn by the fuel pump 21 from inside the sub-tank 30.

As shown in FIGS. 1 and 2, a jet pump 34 is provided outside of the sub-tank 30 for supplying fuel into the sub-tank 30. The pressurized fuel by the fuel pump 21 is partially taken from the pressurizing section of the fuel pump 21, so as to be supplied to the jet pump 34. The pressurized fuel is jetted from a nozzle (not shown) of the jet pump 34 to an inlet port (not shown) of the sub-tank 30. Besides, surplus fuel exhausted from the pressure regulator 23 or surplus fuel returned from an engine can be supplied to the jet pump 34, so as to be jetted from the nozzle of the jet pump 34 toward the inlet port of the sub-tank 30. The jet pump 34 supplies fuel, which is received in the fuel tank 2, into the sub-tank 30 using drawing pressure generated by the jetted fuel. Thus, the sub-tank 30 is filled with fuel, even if the fuel amount received in the fuel tank 2 is decreased. The transfer jet pump 40 is received in an auxiliary chamber 35 of the sub-tank 30 for transferring fuel, which is received in another tank, into a tank section receiving the pump module 20.

Figure 4:
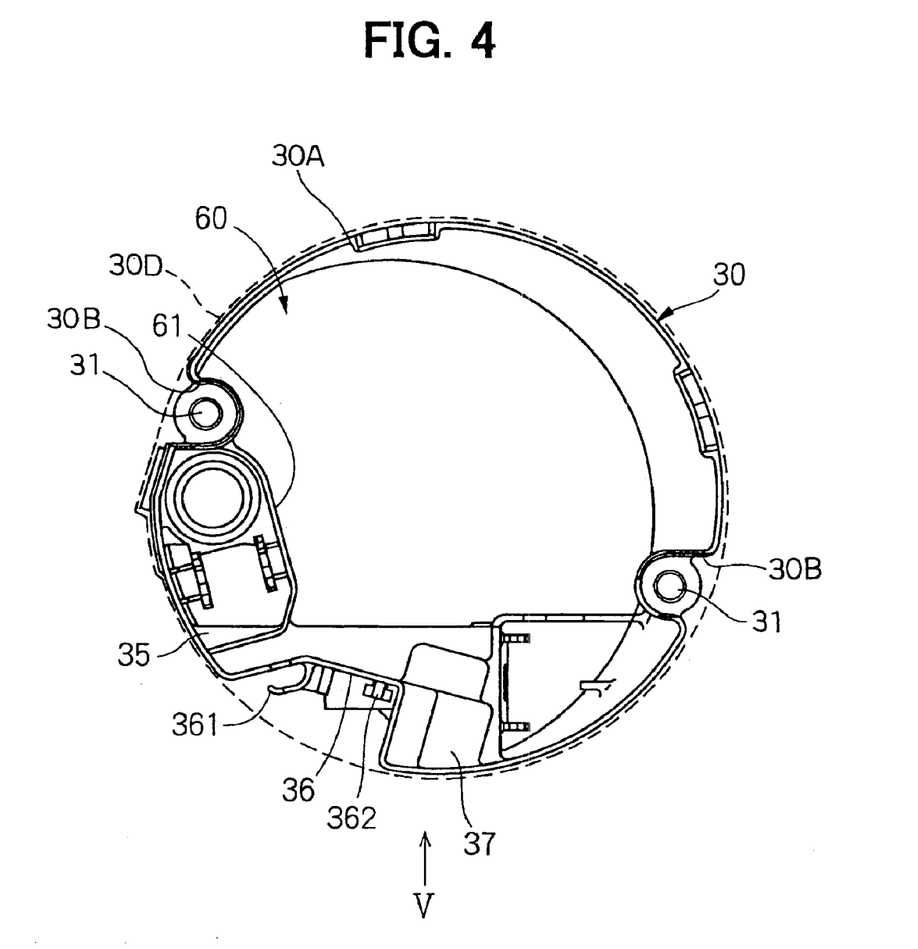
FIG. 4 is a plan view showing the sub-tank of the fuel feed apparatus.
Figure 5:
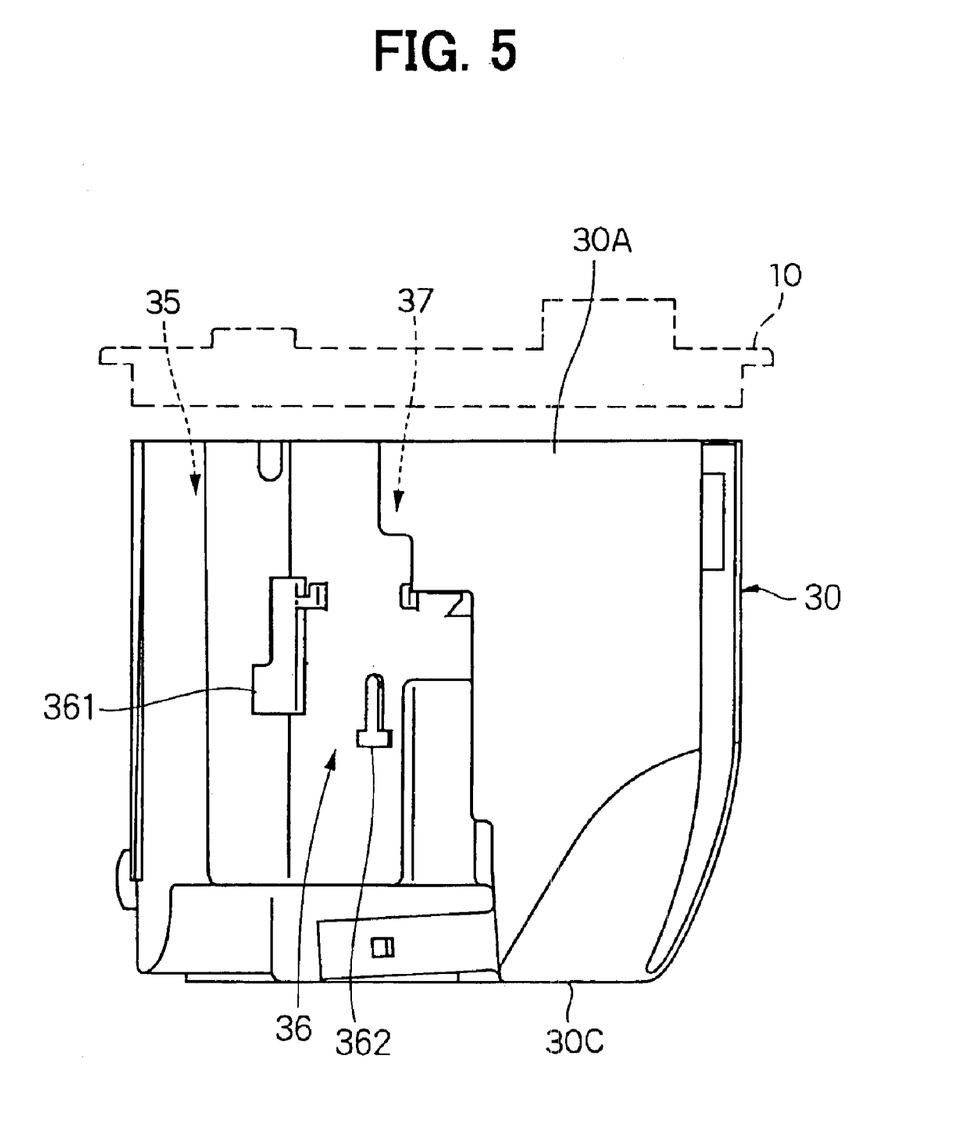
FIG. 5 is a side view showing the sub-tank from the arrow V in FIG. 4.

The sub-tank 30 is a bottomed container. The sub-tank 30 is formed in an approximately cylindrical shape. As shown in FIG. 4, a circumferentially partial section of the sidewall 30A of the sub-tank 30 recesses in the diametrical direction of the sub-tank 30, so that a step section 36 is formed. The sub-tank 30 is formed in a substantially cylindrical-shape except for the step section 36. The step section 36 of the sub-tank 30 is formed to be flat. As shown in FIGS. 1 and 2, the jet pump 34 and a sender gauge (fuel level detecting unit) 50 are located at the step section 36. As shown in FIGS. 4 and 5, mounting sections 361, 362 are formed on the step section 36. The mounting section 361 receives the jet pump 34. The mounting section 362 receives the sender gauge 50 as understood from FIG. 2.

Here, the flat step section 36 is formed in the sub-tank 30 for mounting the sender gauge 50, so that the sender gauge 50 is included in the project area 30D (i.e., substantially circular area) of the sub-tank 30. Thus, the project area 30D of the sub-tank 30 is reduced with respect to the installation plane of the fuel tank 2, so that the occupied area needed for mounting the sub-tank 30 is reduced.

As shown in FIG. 4, an inner chamber 60 is formed on the inner side of the sidewall 30A of the sub-tank 30 for receiving the pump module 20, pressure regulator 23, and the suction filter 32. The inner chamber 60 is partially partitioned by a wall 61. The auxiliary chamber 35 is defined by the sidewall 30A of the sub-tank 30 and the wall 61, so as to receive the transfer jet pump 40.

As shown in FIG. 1, the sender gauge 50 includes a sensor section 51, an arm member 52, and a float (not shown) provided on the end of the arm member 52. The float floats on fuel in the fuel tank 2. The arm member 52 is connected with the float at its end, and rotates around the other end connected with the sensor section 51. Plural conductive patterns are formed in the sensor section 51. Resistance of the conductive patterns is respectively different. The end section of the arm member 52 is connected with the sensor section 51, so that the end section can contact the conductive patterns formed in the sensor section 51. The float displaces as a remaining fuel amount varies in the fuel tank 2, so that the arm member 52 rotates in accordance with the displacement amount of the float. Thus, contact condition between the arm member 52 and the conductive patterns formed in the sensor section 51 varies, so that remaining fuel amount in the fuel tank 2 can be detected. The detected fuel amount is transmitted to the ECU (not shown) via the lead wires 13, the connector 14, and the electric connector 12.

As shown in FIG. 5, the cylindrical sidewall 30A of the sub-tank 30 extends on the flange 10 side in the circumferential direction of the sub-tank 30, with respect to the sidewall 30A on the base wall 30C side of the sub-tank 30. Namely, the sidewall 30A is partially not recessed on the flange 10 side, so that the cylindrical plane of the sidewall 30A is formed adjacent to the step section 36 on the flange 10 side.

Thus, as shown in FIGS. 4 and 5, a space 37 is formed in the sub-tank 30, so as to be connected with the inner chamber 60, which receives the pump module 20. The space 37 is formed in the sub-tank 30 on the flange 10 side, and is formed adjacent to the step section 36. In this case, at least a portion of the space 37 overlaps with at least a portion of the step section 36 in the axial direction.

The space 37 is formed between the two insertion sections 31 in the circumferential direction of the sub-tank 30. The two shafts 15 are inserted in the insertion sections 31. The space 37 is formed in the sub-tank 30 on the outer peripheral side with respect to the pump module 20 (FIG. 2). Thus, the space 37 becomes a remaining space where components of the fuel feed apparatus 1, such as the pump module 20, are not received. Besides, the connector 14 is arranged between the two shafts 15 in the circumferential direction of the flange 10, so as to correspond to the space 37 in the sub-tank 30 in the axial direction of the flange 10. Namely, the connector 14 and the space 37 are opposed each other, so that the connector 14 can be received in the space 37 formed in the sub-tank 30 on the flange 10 side.

The flange 10 is axially movably connected to the sub-tank 30. The flange 10 is movable relative to the sub-tank 30 between a first position (FIG. 6) and a second position (FIG. 1) in the axial direction.

Figure 6:
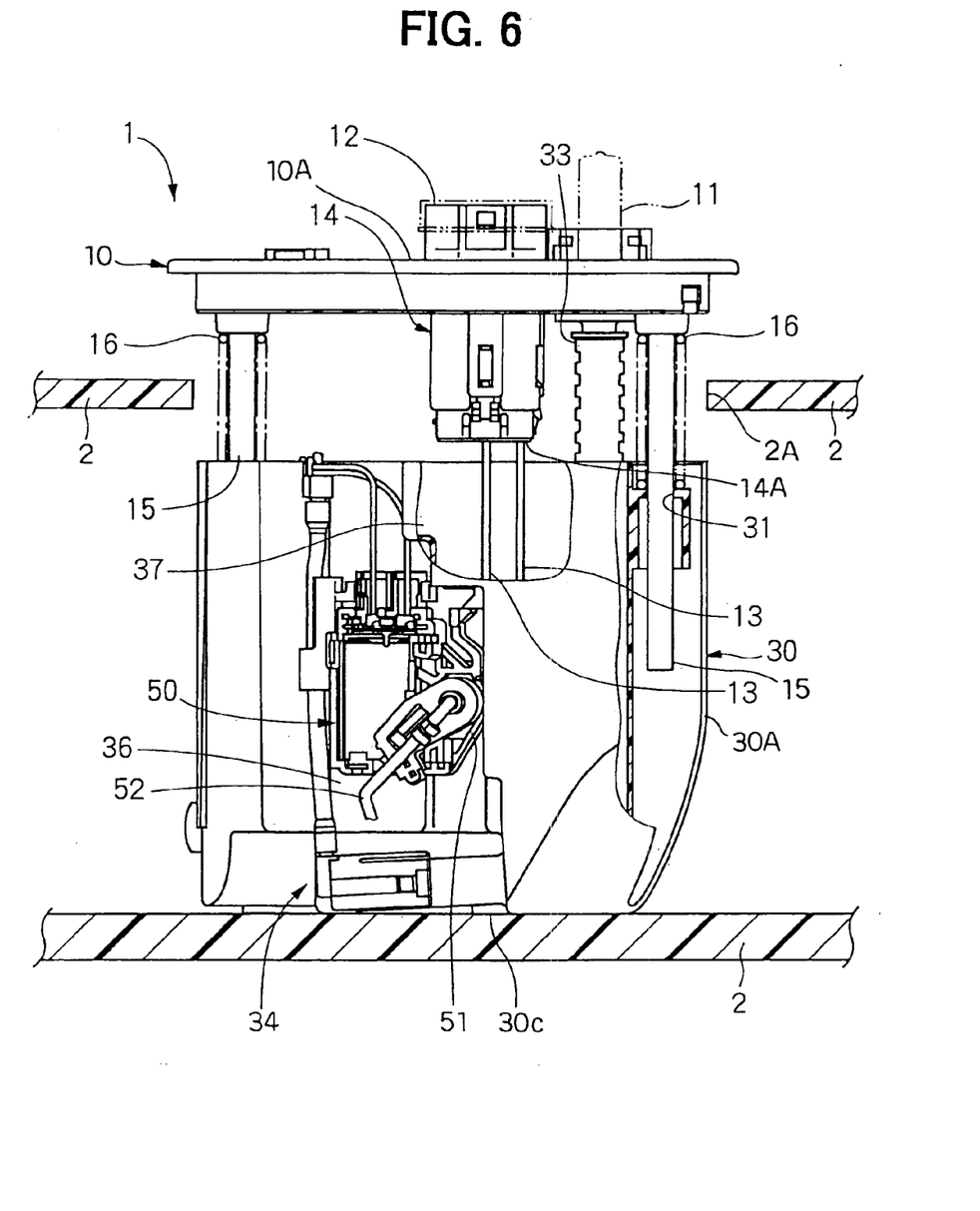
FIG. 6 is a partially cross-sectional side view showing the fuel feed apparatus when the sub-tank is in a first position.

As shown in FIG. 6, the flange 10 is further spaced apart from the sub-tank 30 in the first position, in comparison to the second position as shown in FIG. 1. When the flange 10 is positioned in the first position due to disengagement of the flange 10 from the fuel tank 2, a distal end 14A of the connector 14 is out of an axial extent (top end) of the sub-tank 30 measured in the axial direction. Here, the connector 14 is oriented toward the base wall 30C of the sub-tank 30. The distal end 14A of the connector 14 is distal from the flange 10.

As shown in FIG. 1, when the flange 10 is positioned in the second position due to engagement of the flange 10 with the fuel tank 2, the distal end 14A of the connector 14 is received in the space 37 defined in the sub-tank 30, such that the distal end 14A of the connector 14 is located in the axial extent of the sub-tank 30.

Therefore, the connector 14 does not interfere with the components included in the sub-tank 30 such as pump module 20, the pressure regulator 23, and the jet pump 34, when distance between the flange 10 and the sub-tank 30 is reduced. Thus, the length between the flange 10 and the sub-tank 30 can be reduced, so that the sub-tank 30 can contact the flange 10 at each corresponding ends. Therefore, the height of the fuel feed apparatus 1 can be reduced.

Here, the space 37 is formed in the sub-tank 30 on the flange 10 side with respect to the step section 36, where the sender gauge 50 is mounted. Besides, it is sufficient if a flat space is secured in the step section 36 for mounting the sensor section 51 of the sender gauge 50 and a rotating space needed for the arm member 52. Accordingly, flat space is not needed on the upper side (i.e., flange 10 side) of the step section 36, where the sender gauge 50 is mounted. If the space 37 is not formed, the upper side of the sensor section 51 becomes a dead space. Therefore, the space 37 is formed in the sub-tank 30 on the flange 10 side with respect to the step section 36, so that the connector 14 protruding from the flange 10 is received in the dead space. Thus, the dead space can be efficiently used. Another additional space need not be formed in the sub-tank 30 for receiving the connector 14. Accordingly, the height of the fuel feed apparatus 1 can be reduced without increasing the size of the sub-tank 30.

In the first embodiment, the shafts 15 and the insertion sections 31 for receiving the shafts 15 are arranged inside of the sub-tank 30 with respect to the diametrical direction of the sub-tank 30. Namely, the shafts 15 and the insertion sections 31 do not protrude from the sub-tank 30 in the diametrically outer direction. Thus, the project area 30D is decreased. Here, the sub-tank 30 passes through the opening 2A when the sub-tank 30 of the fuel feed apparatus 1 is installed on the fuel tank 2. The opening 2A is substantially equivalent to the project area 30D. Therefore, the area of the opening 2A of the fuel tank 2 can be reduced. Besides, the shape of the opening 2A can be simplified.

(Second Embodiment)

Figure 7:
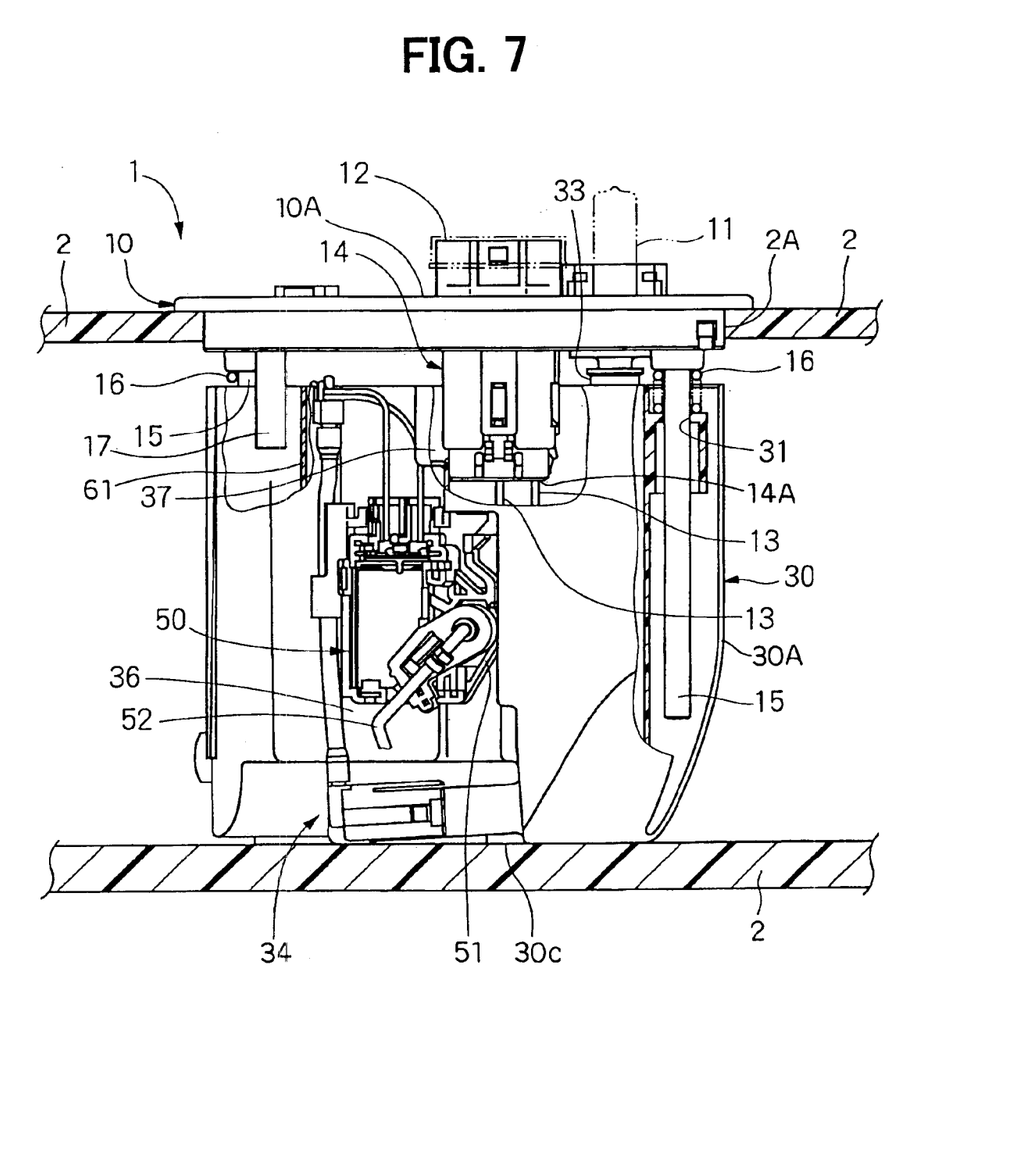
FIG. 7 is a partially cross-sectional side view showing a fuel feed apparatus according to the second embodiment of the present invention.
Figure 8:
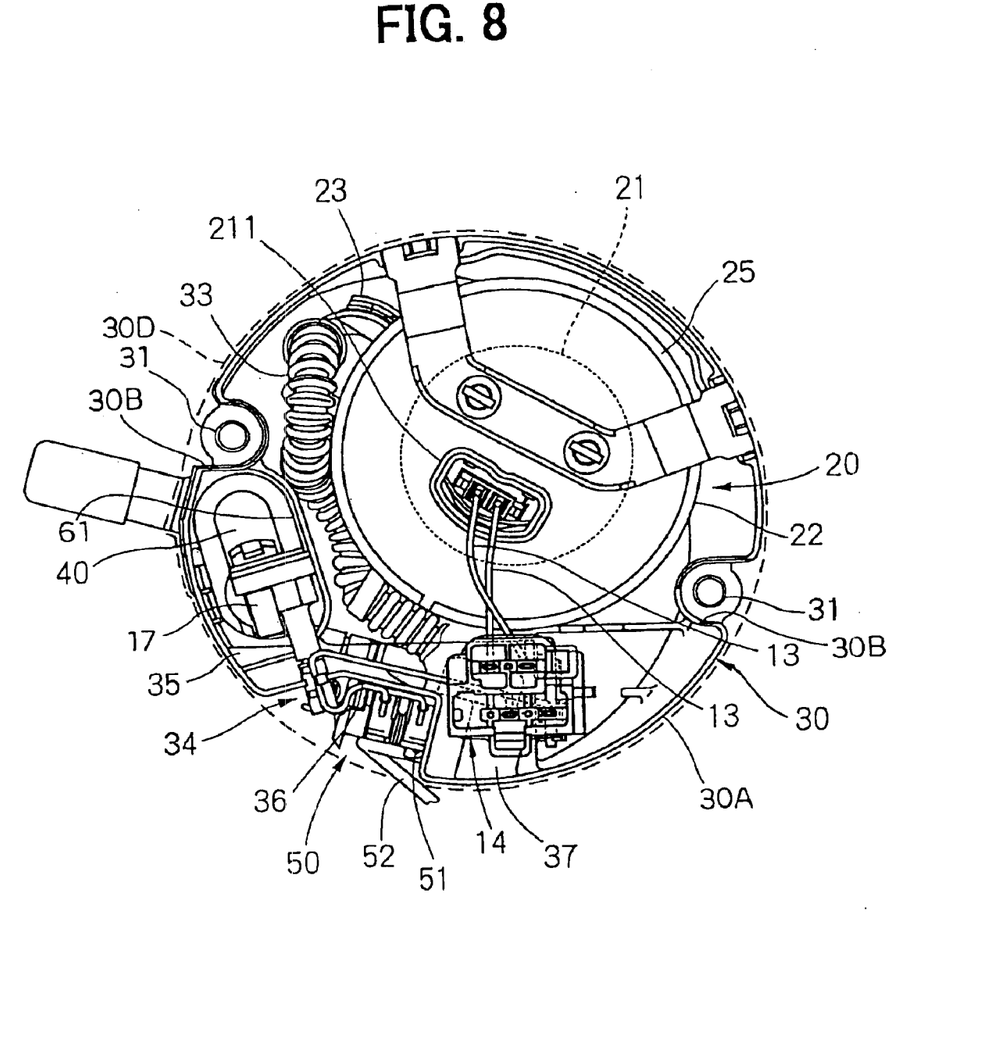
FIG. 8 is a plan view showing the fuel feed apparatus including the sub-tank, connector and the second device protruding from the flange according to the second embodiment.

As shown in FIGS. 7 and 8, a second auxiliary device, such as a cut valve 17 is further provided on the flange 10 in addition to the connector 14. Here, the cut valve 17 is used for preventing air from flowing in reverse as opposed from a normal flow from the fuel tank 2 to a canister.

The cut valve 17 protrudes from the flange 10 toward the sub-tank 30, and received in the auxiliary chamber 35 formed in the sub-tank 30. Here, the transfer jet pump 40 or the like is received in the auxiliary chamber 35. A space (i.e., dead space) is formed in the auxiliary chamber 35 on the flange 10 side with respect to the transfer jet pump 40, or the like. Therefore, the cut valve 17 can be received in the space formed on the upper side of the auxiliary chamber 35. Therefore, the cut valve 17 can be received without increasing the size of the sub-tank 30.

The devices 14, 17 are movable with respect to the spaces 35, 37 defined in the sub-tank 30 in the axial direction which is generally perpendicular to the plane of the lid 10. The devices 14, 17 are oriented to the spaces 35, 37, which are defined in the sub-tank 30, in the axial direction. The fuel pump 21 is eccentrically arranged in the sub-tank 30. The spaces 35, 37 are defined in the opposite side of the fuel pump 21 with respect to the central axis of the sub-tank 30.

Namely, the fuel pump 21 is substantially arranged in the vicinity of the sidewall 30A. Therefore, large space is secured in the sub-tank 30, so that the space in the sub-tank 30 can be efficiently used for installation of devices.

The sub-tank 30 has the step section 36 on the peripheral side of the sub-tank 30. The spaces 35, 37 are at least partially non-overlapping with respect to the step section 36 in the circumferential direction of the sub-tank 30.

Namely, inner space can be sufficiently secured in the sub-tank 30, even inner space of the sub-tank 30 is decreased due to forming the step section 36. Thus, inner space of the sub-tank 30 and installation area in the step section 36 can be sufficiently secured without enlarging the project area 30D of the sub-tank 30.

Here, the devices, such as the connector 14 (first auxiliary device) and the cut valve (second auxiliary device) 17, protrude from the flange 10 toward the sub-tank 30. The devices 14, 17 can be arranged on the circumferential side of the flange 10, so that the devices 14, 17 are separately located from each other. Each location of the devices 14, 17 is determined so as to correspond to either of the space 37 or the auxiliary chamber 35, so that the devices 14, 17 can be received in both the space 37 and the auxiliary chamber 35.

If the transfer jet pump 40 is not used, the auxiliary chamber 35 of the sub-tank 30 can be entirely used for receiving the second auxiliary device 17 protruded from the flange 10.

The physical relationships between the devices 14, 17, and the space 37 and the auxiliary chamber 35 are not limited to the relationship described above. The devices protruded from the flange 10 are not limited to a connector and a cut off valve. Other devices can be provided on the flange 10. The devices protrude from the flange 10 toward the sub-tank 30, and received in the sub-tank 30.

The flange 10 is axially movably connected to the sub-tank 30, and movable relative to the sub-tank 30 as described above. That is, the flange 10 can displace with respect to the sub-tank 30 via the shafts 15 and the insertion sections 31. Therefore, the distance between the flange 10 and the sub-tank 30 can be flexibly changed while the fuel feed apparatus 1 is received in the fuel tank 2. Specifically, the distal end 14A of the connector 14 can be entirely out of an axial extent (top end) of the sub-tank 30 measured in the axial direction, while the flange 10 is secured on the upper section of the fuel tank 2 and the fuel feed apparatus 1 is received in the fuel tank 2 in a normal operating condition. When temperature is changed and the fuel tank 2 expands, the devices protruded from the flange 10 toward the sub-tank 30 can be entirely out of the sub-tank 30. Even in this case, the flange 10 and the sub-tank 30 are movably connected via the shafts 15 and the insertion sections 31 and the fuel feed apparatus 1 is normally received in the fuel tank 2. Here, the devices protruded from the flange 10 are the connector 14 (first auxiliary device) and the cut valve (second auxiliary device) 17, for example.

Other various changes and modifications are to be understood as being within the scope of the present invention as defined by the appended claims.

What is claimed is:

1. A fuel feed apparatus for pumping fuel received in a fuel tank, which has an opening, the fuel feed apparatus comprising:

a lid that covers the opening of the fuel tank;
   a sub-tank that is received in the fuel tank and is connected to the lid;
   a fuel pump that is received in the sub-tank and pumps fuel received in the fuel tank; and
   a first auxiliary device that is provided to the lid and projects from the lid toward a bottom base wall of the sub-tank;
   wherein:
   the first auxiliary device is movable with respect to a space defined in the sub-tank in an axial direction which is generally perpendicular to a plane of the lid;
   the first auxiliary device is oriented to the space, which is defined in the sub-tank, in the axial direction;
   the fuel pump is eccentrically arranged in the sub-tank; and
   the space is defined in the opposite side of the fuel pump with respect to a central axis of the sub-tank.

2. The fuel feed apparatus according to claim 1, further comprising:
   a pump module received in the sub-tank,
   wherein:
   the pump module includes both the fuel pump and a fuel filter; and
   the fuel filter surrounds the fuel pump.

3. The fuel feed apparatus according to claim 2, further comprising, a jet pump for transferring fuel from the fuel tank, wherein the sub-tank further includes an auxiliary chamber for receiving the jet pump.

4. The fuel feed apparatus according to claim 1, further comprising:
   a second auxiliary device that is provided to the lid and projects from the lid toward a base wall of the sub-tank,
   wherein the first auxiliary device and the second auxiliary device are separately arranged from each other in a circumferential direction of the lid.

5. The fuel feed apparatus according to claim 1, further comprising:
   a detecting unit for detecting a fuel amount in the fuel tank,
   wherein:
   the sub-tank has a step section on a peripheral side of the sub-tank; and
   the detecting unit is provided at the step section.

6. The fuel feed apparatus according to claim 5, wherein, the step section is recessed in a diametric direction of the sub-tank.

7. The fuel feed apparatus according to claim 5, wherein the space is defined on the lid side with respect to the step section.

8. The fuel feed apparatus according to claim 1, further comprising:
   a plurality of supporting members that are secured to the lid,
   wherein:
   the supporting members are axially movably connected to the sub-tank; and
   the first auxiliary device is arranged between the supporting members in a circumferential direction of the lid.

9. The fuel feed apparatus according to claim 1,
   wherein:
   the space is defined between the fuel pump and a sidewall of the sub-tank; and
   the auxiliary device is opposed the space.

10. The fuel feed apparatus according to claim 1, wherein a sidewall of the sub-tank extends on the flange side in the circumferential direction with respect to the sidewall on the base wall side.

11. The fuel feed apparatus according to claim 5, wherein at least a portion of the space overlaps with at least a portion of the step section in the axial direction.

12. A fuel feed apparatus for pumping fuel received in a fuel tank, which has an opening, the fuel feed apparatus comprising:

a lid that covers the opening of the fuel tank;
    a sub-tank that is received in the fuel tank and is axially movably connected to the lid in such a manner that the lid is movable relative to the sub-tank between a first position and a second position in an axial direction, which is generally perpendicular to a plane of the lid, and the first position is further spaced apart from the sub-tank in comparison to the second position;
    a fuel pump that is received in the sub-tank and pumps fuel received in the fuel tank; and
    a first auxiliary device that is secured to the lid and projects from the lid toward a base wall of the sub-tank in the axial direction, wherein:
    when the lid is positioned in the first position, a distal end of the first auxiliary device, which is oriented toward the base wall of the sub-tank and is distal from the lid, is out of an axial extent of the sub-tank measured in the axial direction; and when the lid is positioned in the second position, the distal end of the first auxiliary device is received in a space defined in the sub-tank such that the distal end of the auxiliary device is located in the axial extent of the sub-tank.

13. The fuel feed apparatus according to claim 1, wherein:

the first auxiliary device is at least partially received in a space defined in the sub-tank in the axial direction so that a distal end side of the first auxiliary device facing the base wall of the sub-tank and distal from the lid is lower than a top surface of the sub-tank.

14. A fuel feed apparatus for pumping fuel received in a fuel tank, which has an opening, the fuel feed apparatus comprising:

a lid that covers the opening of the fuel tank;

a sub-tank that is received in the fuel tank and is connected to the lid;

a fuel pump that is received in the sub-tank and pumps fuel received in the fuel tank; and a first auxiliary device that is provided to the lid and projects from the lid toward a bottom base wall of the sub-tank;

wherein:

the first auxiliary device is movable with respect to a space defined in the sub-tank in an axial direction which is generally perpendicular to a plane of the lid;

the first auxiliary device is oriented to the space, which is defined in the sub-tank, in the axial direction;

the sub-tank has a step section on a peripheral side of the sub-tank;

the step section is recessed in a diametric direction of the sub-tank; and the space is at least partially non-overlapping with respect to the step section in a circumferential direction of the sub-tank.

* * * * *